(12) United States Patent
Uchida et al.

(10) Patent No.: US 8,624,993 B2
(45) Date of Patent: Jan. 7, 2014

(54) VIDEO IMAGE PICKUP DEVICE

(75) Inventors: Tomokazu Uchida, Osaka (JP);
Masahiro Ogawa, Osaka (JP);
Masahiro Hojo, Osaka (JP)

(73) Assignee: Panasonic Corporation, Osaka (JP)

( * ) Notice: Subject to any disclaimer, the term of this patent is extended or adjusted under 35 U.S.C. 154(b) by 149 days.

(21) Appl. No.: 13/210,951

(22) Filed: Aug. 16, 2011

(65) Prior Publication Data
US 2011/0298942 A1  Dec. 8, 2011

Related U.S. Application Data

(63) Continuation of application No. PCT/JP2009/007280, filed on Dec. 25, 2009.

(30) Foreign Application Priority Data

Feb. 23, 2009   (JP) ................................ 2009-038849

(51) Int. Cl.
*H04N 5/228*   (2006.01)

(52) U.S. Cl.
USPC ............... 348/222.1; 348/208.1; 348/208.99

(58) Field of Classification Search
USPC .............. 348/208.1, 208.99, 218.1, 222.1, 348/333.01–333.04
See application file for complete search history.

(56) References Cited

U.S. PATENT DOCUMENTS

| | | | | |
|---|---|---|---|---|
| 5,565,921 | A * | 10/1996 | Sasaki et al. | 375/240.13 |
| 6,151,965 | A * | 11/2000 | Watarai | 73/504.16 |
| 6,690,732 | B2 | 2/2004 | Naito et al. | |
| 7,881,543 | B2 | 2/2011 | Okada et al. | |
| 8,363,726 | B2 * | 1/2013 | Murabayashi et al. | 375/240.16 |
| 2001/0017887 | A1 | 8/2001 | Furukawa et al. | |
| 2007/0273750 | A1* | 11/2007 | Tanaka | 348/14.01 |
| 2009/0033746 | A1* | 2/2009 | Brown et al. | 348/155 |

FOREIGN PATENT DOCUMENTS

| | | |
|---|---|---|
| JP | 09-200769 | 7/1997 |
| JP | 09-326955 | 12/1997 |
| JP | 2001-245303 | 9/2001 |
| JP | 2001-251629 | 9/2001 |
| JP | 2001-352545 | 12/2001 |
| JP | 2006-013570 | 1/2006 |
| JP | 2006-166233 | 6/2006 |

\* cited by examiner

*Primary Examiner* — Yogesh Aggarwal
(74) *Attorney, Agent, or Firm* — McDermott Will and Emery LLP

(57) ABSTRACT

An image processor detects an on-screen motion of a photographic subject in video image data generated by an image sensor provided in a camera body and outputs a photographic subject motion information. A sensor detects a motion of the camera body and outputs the detected motion as a camera body motion information. A scene decision encoding controller decides an image pickup condition of the video image data based on the photographic subject motion information and the camera body motion information, and performs an encoding amount regulation control suitable for the decided image pickup condition to an image compression processor.

35 Claims, 6 Drawing Sheets

(first frame)

(second frame)

(overlapping first and second frames)

F I G. 3
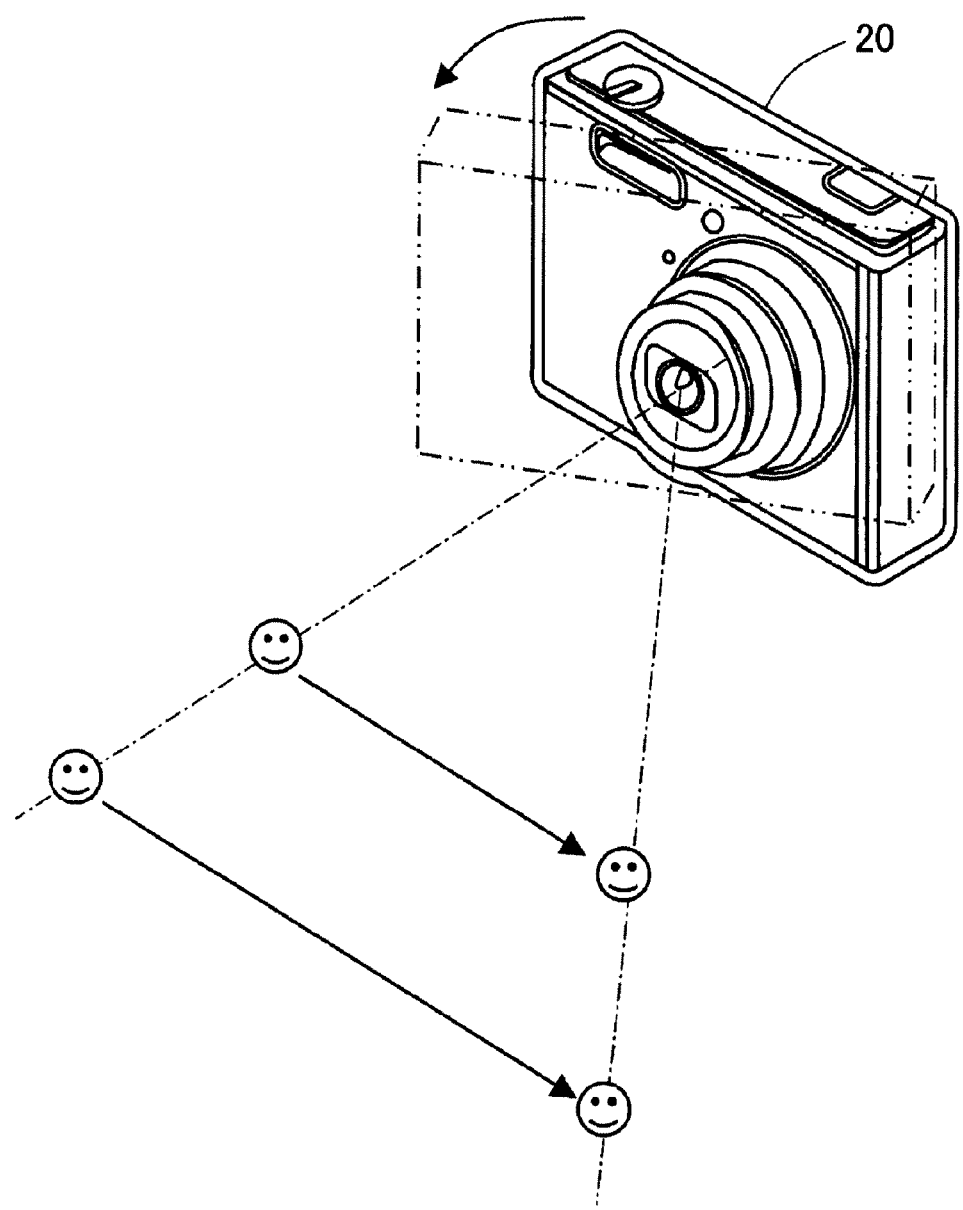

VIDEO IMAGE PICKUP DEVICE

This application is a continuation of International Application No. PCT/JP2009/007280, whose international filing date is Dec. 25, 2009 which in turn claims the benefit of Japanese Patent Application No. 2009-038849, filed on Feb. 23, 2009, the disclosures of which Applications are incorporated by reference herein. The benefit of the filing and priority dates of the International and Japanese Applications is respectfully requested.

FIELD OF THE INVENTION

The present invention relates to a video image pickup device, more particularly to a technology for solving the conventional problem of trade off between a moderate encoding amount and a good image quality in an encoding process to shoot a video image where a strenuous motion is generated. Examples of a product loaded with the video image pickup device according to the present invention are digital still cameras and digital video cameras.

BACKGROUND OF THE INVENTION

The inter-frame encoding characterized in that frames of a video image signal are closely interrelated is widely used as a technique for data compression in video image signals. So far were introduced various methods of the inter-frame encoding, many of which are featured by encoding an inter-frame difference of a video image signal. In an encoding technique often employed as the inter-frame encoding, orthogonal transform is used, in which two-dimensional image correlation is efficiently availed in a differential signal. The internationally standardized video image encoding for storage media such as ISO/IEC 11172-2 (generally called MPEG1), in particular, employs an encoding technique based on DCT (Discrete Cosine Transform) which is an example of the orthogonal transform.

In the case where a target frame is an inter-frame encoding frame, the inter-frame encoding technique calculates an inter-frame differential value of an image signal and transforms the calculated differential value into a variable code based on, for example, Huffman encoding. The inter-frame encoding in which the differential value thus transformed increases inter-frame correlation after motion compensation because of the characteristics of a video image, therefore, allocates a short variable code to 0 or a differential value approximate to 0 so that a compression efficiency is improved. It is unnecessary to encode any data of divided blocks resulting in 0 after motion compensating prediction, which further improves the compression efficiency.

It is an indispensable step in data compression of video image signals to adjust an encoding amount (rate control). A known technique to adjust the encoding amount is to change a quantization step, more specifically, the quantization step used in data encoding is decided by monitoring a generated encoding amount. A virtual buffer which accepts generated codes and outputs them based on a constant rate (fixed rate) is prepared, and the quantization step is calculated in proportion to a level of buffer fullness. More specifically, the quantization step is increased when the buffer fullness is elevated, while the quantization step is decreased when the buffer fullness goes down, so that the encoding is decelerated with a large quantization step and the encoding is accelerated with a small quantization step. Therefore, the generated encoding amount can be constantly regulated on average when the buffer fullness is controlled to stay at, for example, around 50%.

In any scene where there is a large motion, the differential encoding becomes difficult, increasing the encoding amount even if the quantization step is changed. Although the quantization step is increased to adjust the encoding amount, an image quality is unavoidably deteriorated. To avoid the image quality deterioration when the quantization step is changed to adjust the encoding amount, for example, the motion of each frame is evaluated based on information on camera shake or motion vectors, and the quantization step is increased in any frame decided as having a large motion as compared to a preceding frame so that the encoding amount is controlled.

In the quantization step change method, a fixed rate is used to control the encoding amount. Apart from controlling the encoding amount based on a fixed rate, a variable rate may be employed, in which the quantization step is fixed to allow the encoding amount to be variable. More specifically, the quantization step is decided in advance so that the image quality does not fall below an expected quality level and then fixed for the encoding process.

PRIOR ART DOCUMENT

Patent Document

Patent Document 1: Unexamined Japanese Patent Applications Laid-Open No. 2006-13570
Patent Document 2: Unexamined Japanese Patent Applications Laid-Open No. 2006-166233

SUMMARY OF THE INVENTION

Problem to be Solved by the Invention

Though an encoding efficiency is improved when inter-frame differential information is used to encode data, inter-frame correlation is weakened or completely lost when a strenuous motion is generated between the frames. Therefore, it becomes difficult to encode data, and intra-frame information alone is available for the encoding process. The intra-frame encoding process, however, is not as efficient as the inter-frame differential encoding process, consequently increasing the encoding amount.

Adjusting the encoding amount based on a fixed rate, the encoding amount increases in any frames where a strenuous motion is generated, which makes it necessary to adjust the encoding amount in subsequent frames. This unfavorably increases the quantization step to an overly high value, causing significant deterioration of the image quality, and the deterioration is eminent particularly in any frames including low frequency components.

To avoid the image quality deterioration, the quantization step may be increased based on the information of camera shake to control the encoding amount. However, a frame having a strenuous motion is degraded because of its large quantization step, and the degraded frame affects other frames that follow.

The encoding amount may be controlled by reducing high frequency components in pre-encoding YC data, in which, however, a moving photographic subject and a camera moving to follow the photographic subject are all similarly captured as a motion. As a result, the high frequency components are unnecessarily reduced in video images particularly wanted by a photographer.

The present invention was accomplished to solve these conventional technical problems. A main object of the present invention is to balance a moderate encoding amount and a good image quality by solving the conventional problem of trade off therebetween when there is a large motion of a photographic subject image because of a positional relationship of the subject relative to a screen.

Means for Solving the Problem

1) The present invention provides a scene decision encoding controller configured to decide an image pickup condition before starting an encoding process. The scene decision encoding controller decides the video image pickup condition based on two different motion informations; information on motion of a camera body, and information on motion of a photographic subject detected on a screen, and outputs a decision result thereby obtained as encoding control information. The on-screen motion information of the photographic subject is generated by an image processor configured to signal-process video image data inputted from an image sensor. For example, angular rate information used for lens control may be used as the camera body motion information.

A video image pickup device according to the present invention comprises:
an image processor configured to detect an on-screen motion of a photographic subject in video image data generated by an image sensor provided in a camera body and output a photographic subject motion information;
an image compression processor configured to compress the video image data into codes;
a sensor configured to detect a motion of the camera body and output the detected motion as a camera body motion information; and
a scene decision encoding controller configured to decide an image pickup condition of the video image data based on the photographic subject motion information and the camera body motion information, wherein
the scene decision encoding controller performs an encoding amount regulation control suitable for the decided image pickup condition to the image compression processor.

In the video image pickup device according to an aspect of the present invention, the image pickup condition is a condition where an actual motion of the photographic subject and the motion of the camera body are combined. In the video image pickup device according to another aspect of the present invention, the scene decision encoding controller decides the image pickup condition based on combination of a degree of the motion of the camera body indicated by the camera body motion information and a degree of the on-screen motion of the photographic subject in the video image data indicated by the photographic subject motion information.

Examples of the image pickup condition are; "on-screen motion of photographic subject", "motion of camera body alone", "subject-following motion of camera body", and "neither photographic subject nor camera body in motion". A situation represented by "on-screen motion of photographic subject" is that the camera body is at rest but the photographic subject image actually moving shows a motion on the screen. A situation represented by "motion of camera body alone" is that the photographic subject is at rest but the camera body alone moves, making it appear that the photographic subject is showing a relative motion on the screen". A situation represented by "subject-following motion of camera body" is that a photographer moves the camera body to follow the motion of the photographic subject so that the moving photographic subject constantly stays on the screen. This situation is created when the photographer is capturing the video images of the photographic subject while trying to keep the subject in a predetermined region on the screen, including "follow shot" which is an image shooting technique when digital still cameras are used. A situation represented by "neither photographic subject nor camera body in motion" is that the camera body and the photographic subject are both at rest. The scene decision encoding controller decides the image pickup condition based on combination of the motion information of the camera body and the on-screen motion information of the photographic subject and outputs the decision result thereby obtained as the encoding control information. The image compression processor or an image compression/decompression processor which received the encoding control information compresses the video image data into codes as requested by the encoding control information. Thus, the encoding amount regulation control suitable for the decided image pickup condition is flexibly selected so that the encoding amount is controlled without deteriorating an image quality.

When, for example, the encoding control information indicates "subject-following motion of camera body", the photographer is taking video images that are very important to him. Therefore, the encoding amount should not be reduced so that compressed video image data avoids deterioration of an image quality, thereby achieving a high definition.

When, for example, the encoding control information indicates "motion of camera body alone", it is preferable to remove high frequency components of inputted YC data to thereby reduce the encoding amount by taking advantage of the visual characteristics that deterioration of an image quality is unlikely to be noticeable when a whole image is in motion.

When, for example, the encoding control information indicates "on-screen motion of photographic subject", a compression rate is increased to reduce the encoding amount.

When, for example, the encoding control information indicates "neither photographic subject nor camera body in motion", it is unnecessary to control the encoding amount.

2) In the video image pickup device according to still another aspect of the present invention, the sensor detects an angular rate applied to the camera body as the motion of the camera body. The angular rate is a preferable example of the camera body motion information.

3) The video image pickup device according to still another aspect of the present invention further comprises:
a lens controller configured to give a motion to balance out the angular rate to a lens unit which condenses an imaging light on the image sensor to thereby compensate for an on-screen motion of the photographic subject generated by the angular rate which should be disregarded; and
an angular rate sensor configured to detect the angular rate and output the detected angular rate to the lens controller, wherein
the angular rate sensor serves as the sensor.

According to the mode wherein the angular rate sensor serves as the sensor, the required structural elements can be lessened.

4) In the video image pickup device according to still another aspect of the present invention, the image processor detects a representative point motion information obtained from inter-frame matching of a representative point defined on a screen as the photographic subject motion information. The representative point inter-frame matching is used to correct camera shake, in which a representative point of a block (curb) in an image data region is defined to detect how far the point transfers in a subsequent frame. The aspect of the present invention, wherein the motion information obtained from the representative point inter-frame matching is thus used as the photographic subject motion information, can improve the cost efficiency of the device because of sharing some of the structural elements.

5) In the video image pickup device according to still another aspect of the present invention, the image processor further detects a frequency distribution information in the video image data, and the scene decision encoding controller controls the image compression processor so that the encoding amount regulation control is performed suitably for the decided image pickup condition in each of frequency bands divided based on the frequency distribution information in the video image data.

According to the aspect of the present invention, any image including many high frequency components can be compressed with a high compression rate so that the encoding amount is controlled.

6) In the video image pickup device according to still another aspect of the present invention, the sensor detects an angular rate applied to the camera body as the motion of the camera body, the image processor detects a representative point motion information obtained from inter-frame matching of a representative point defined on a screen as the photographic subject motion information, the image processor further detects a frequency distribution information in the video image data, and the scene decision encoding controller selects one of the angular rate, the representative point motion information, and the frequency distribution information depending on an intended purpose of the video image pickup device and uses the selected information to decide the image pickup condition.

According to the aspect of the present invention, the most suitable information is flexibly used depending on an intended purpose of the video image pickup device so that the image pickup condition is more accurately decided.

7) In the video image pickup device according to still another aspect of the present invention, the scene decision encoding controller differently combines the angular rate, the representative point motion information, and the frequency distribution information depending on an intended purpose of the video image pickup device and uses the combined information to decide the image pickup condition. According to the aspect of the present invention, the most suitably combined information is used depending on an intended purpose of the video image pickup device so that the image pickup condition is more accurately decided.

8) In the video image pickup device according to still another aspect of the present invention, the scene decision encoding controller performs the encoding amount regulation control by filtering/removing high frequency components.

Under the image pickup condition where there is a very strenuous motion of the photographic subject relative to the screen (for example, "on-screen motion of photographic subject", "motion of camera body alone", and "subject-following motion of camera body" as described earlier), the high frequency components are removed to improve a compression efficiency and avoid deterioration of an image quality.

9) In the video image pickup device according to still another aspect of the present invention, the scene decision encoding controller performs a filtering setting in multiple stages per a plurality of frames in the filtering/removal of the high frequency components.

When the higher frequency components are removed, the filtering setting is performed not per frame but per a plurality of frames in multiple stages so that the high frequency components are smoothly removed stepwise. As a result, any sudden changes in the images can be prevented from happening.

10) In the video image pickup device according to still another aspect of the present invention, the scene decision encoding controller performs the encoding amount regulation control by skipping a frame.

Under the image pickup condition where there is a very strenuous motion of the photographic subject relative to the screen, the frames are skipped so that the encoding amount can be more effectively reduced.

11) In the video image pickup device according to still another aspect of the present invention, the scene decision encoding controller performs the encoding amount regulation control by inserting a dummy frame.

Under the image pickup condition where there is a very strenuous motion of the photographic subject relative to the screen, the dummy frame is inserted so that the encoding amount can be more effectively reduced.

12) In the video image pickup device according to still another aspect of the present invention, the scene decision encoding controller performs the encoding amount regulation control by multiplexing a frame.

Under the image pickup condition where there is a very strenuous motion of the photographic subject relative to the screen, the frame is multiplexed so that the encoding amount can be more effectively reduced.

13) In the video image pickup device according to still another aspect of the present invention, the scene decision encoding controller performs the encoding amount regulation control by increasing a quantization step.

Under the image pickup condition where there is a very strenuous motion of the photographic subject relative to the screen, the compression efficiency is improved by increasing the quantization step so that the encoding amount can be more effectively reduced.

14) In the video image pickup device according to still another aspect of the present invention, the scene decision encoding controller performs the encoding amount regulation control by performing one of the followings; filtering/removal of high frequency components, insertion of a dummy frame, multiplexing of a frame, and increasing of a quantization step.

According to the aspect of the present invention, the encoding amount regulation control most suitable for the decided image pickup condition can be flexibly performed. As a result, the encoding amount can be more accurately regulated.

15) In the video image pickup device according to still another aspect of the present invention, the scene decision encoding controller uses threshold values in multiple stages to decide the motion of the photographic subject.

According to the aspect of the present invention, wherein the threshold values in multiple stages are selectively used, the encoding amount can be more flexibly regulated depending on the decided image pickup condition.

16) In the video image pickup device according to still another aspect of the present invention, the scene decision encoding controller uses threshold values and selects one of the threshold values to be used depending on an encoding search range magnitude.

In the case where there is too a strenuous motion of the photographic subject relative to the screen to stay within the search range of motion, inter-frame prediction is not possible, significantly increasing the encoding amount. Under the image pickup condition to be decided through the motion of the photographic subject, the motion of the photographic subject is likely to go beyond the search range of motion. According to the aspect of the present invention, the threshold value to be used to detect and decide the photographic subject motion information is chosen depending on the search range. Therefore, the encoding amount can be suitably regulated under the image pickup condition where there is too a strenuous motion of the photographic subject relative to the screen.

17) In the video image pickup device according to still another aspect of the present invention, the scene decision encoding controller uses threshold values and selects one of the threshold values to be used depending on an encoding frame rate or a bit rate.

The encoding amount allocated to a frame is variable depending on the frame rate or bit rate. According to the aspect of the present invention wherein the threshold value to be used is chosen depending on the encoding frame rate or bit rate, the encoding amount can be regulated in such a flexible manner that follows the encoding amount allocated to each frame.

Effect of the Invention

According to the present invention, the image pickup condition is decided based on the two different motion informations; camera body motion information, and photographic subject motion information, and the decision result thereby obtained is outputted as the encoding control information. Therefore, the image pickup condition can be divided into, for example, "on-screen motion of photographic subject", "motion of camera body alone", "subject-following motion of camera body", and "neither photographic subject nor camera body in motion", and the encoding amount can be suitably regulated depending on the image pickup condition decided at the time. As a result, the encoding amount can be controlled without deteriorating an image quality. The present invention is thus technically advantageous in that a moderate encoding amount and a good image quality are balanced by solving the conventional problem of trade off therebetween when the video image of the photographic subject has a strenuous motion because of a positional relationship of the subject relative to the screen.

BRIEF DESCRIPTION OF THE DRAWINGS

FIG. 3 is a drawing of an operation of an angular rate sensor according to the exemplary embodiment.

EXEMPLARY EMBODIMENTS FOR CARRYING OUT THE INVENTION

Figure 1:
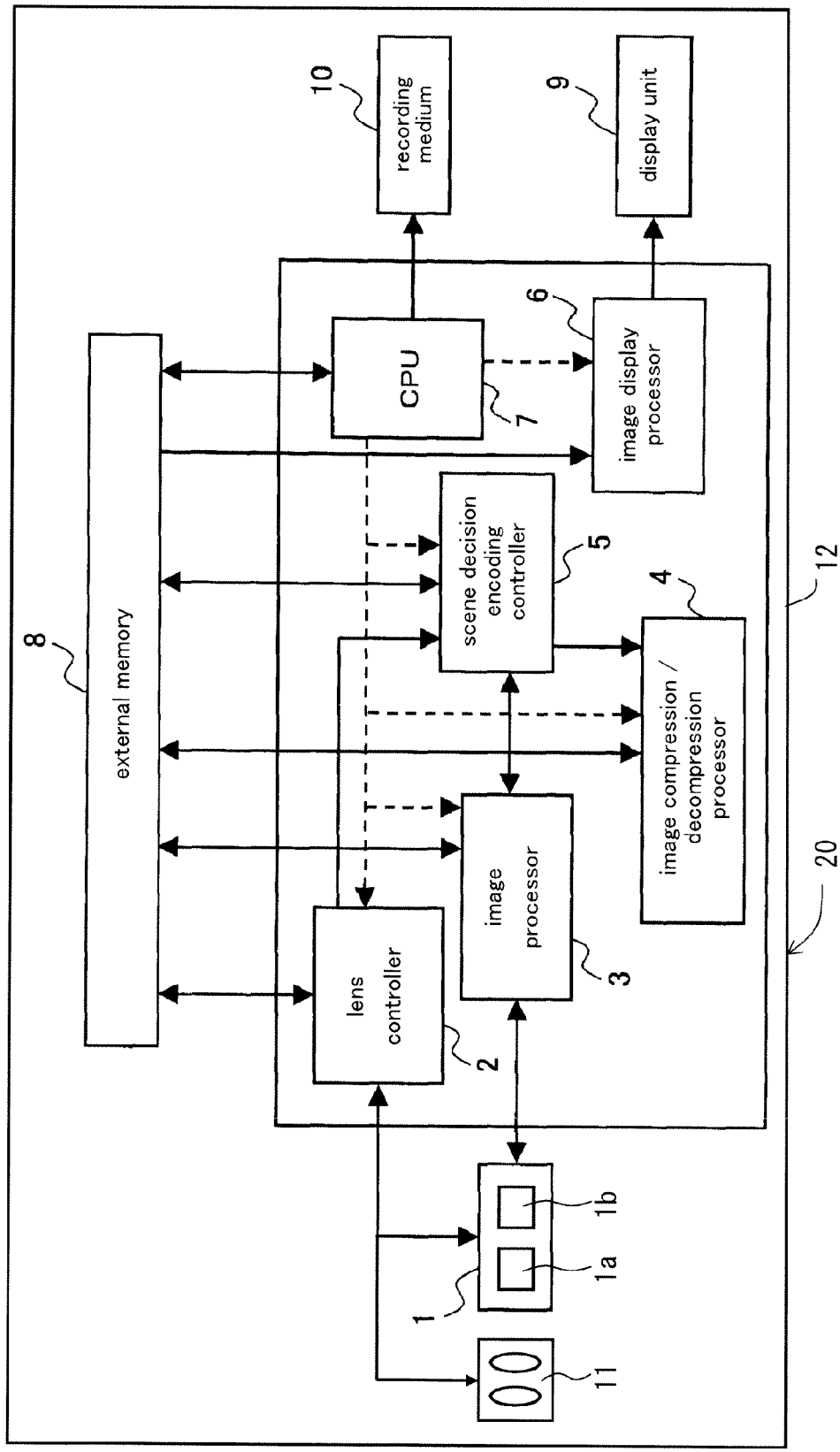
FIG. 1 is a block diagram illustrating a structure of a video image pickup device in a video image recording camera system according to an exemplary embodiment of the present invention.

Hereinafter, an exemplary embodiment of a video image pickup device 12 according to the present invention is described in detail referring to FIG. 1. The video image pickup device 12 is a video image pickup device used in a video image recording camera system, comprising a sensor unit 1, a lens controller 2, an image processor 3, an image compression/decompression processor 4, a scene decision encoding controller 5, an image display processor 6, a CPU (Central Processing Unit) 7, an external memory 8, a display unit 9, a recording medium 10, and a lens unit 11. Th video image pickup device 12 is housed in a camera body 20.

The sensor unit 1 comprises an image sensor 1a and an angular rate sensor 1b. The image sensor 1a fetches a video image and photoelectrically converts the fetched image to output a video image data including RGB information. The angular rate sensor 1b detects a motion of the camera body 20 as an angular rate and outputs a detection result thereby obtained as an angular rate information. The angular rate information is an example of the camera body motion information according to the present invention.

The lens controller 2 gives a motion to balance out the angular rate detected by the angular rate sensor 1b to a predefined lens in the lens unit 11 to thereby correct any on-screen motion of a photographic subject generated by the angular rate which should be disregarded. To enable such a function, the lens controller 2 receives the angular rate information outputted from the angular rate sensor 1b and controls the direction of the lens unit 11 based on the received angular rate information. The lens controller 2 further outputs the received angular rate information to the scene decision encoding controller 5.

The image processor 3 obtains the RGB image data from the image sensor 1a and performs image corrections to the obtained image data such as noise reduction and signal level correction. The image processor 3 then converts the image-corrected image data into YC data and stores the YC data in the external memory 8. Further, the image processor 3 performs a representative point matching process to the obtained image data and analyzes the frequency of the image data. Then, the image processor 3 outputs a representative point matching information (an example of the on-screen motion information of the photographic subject) and an image frequency distribution information obtained from the respective processes to the scene decision encoding controller 5.

The image compression/decompression processor 4 compresses the YC data read from the external memory 8 into codes and stores the compressed encoded data in the external memory 8. Further, the image compression/decompression processor 4 reads the compressed encoded data from the external memory 8, decompresses the read data, and stores the decompressed data in the external memory 8.

The scene decision encoding controller 5 obtains the angular rate information outputted from the lens controller 2 and the representative point matching information outputted from the image processor 3 and decides an image pickup condition based on these two different motion informations. Then, the scene decision encoding controller 5 generates an encoding control information based on a decision result thereby obtained and outputs the generated encoding control information. The image pickup condition is a condition where the motion of the camera body 12 and the motion of the photographic subject are combined. The scene decision encoding controller 5 decides the image pickup condition based on the combination of a degree of the motion of the camera body 12

(indicated by the camera body motion information) and a degree of the on-screen motion of the photographic subject in video image data (indicated by the photographic subject motion information).

The image display processor 6 displays the YC data read from the external memory 8 in a manner suitable for the display unit 9. The CPU 7 is in charge of controlling the overall operation of the device. The display unit 9 displays thereon the data outputted from the image display processor 6. The encoded data read from the external memory 8 by the CPU 7 is written in the recording medium 10. The lens unit 11 is an optical device which condenses an imaging light on the image sensor 1a, comprising a zoom lens capable of changing a focal distance continuously.

Figure 2A:
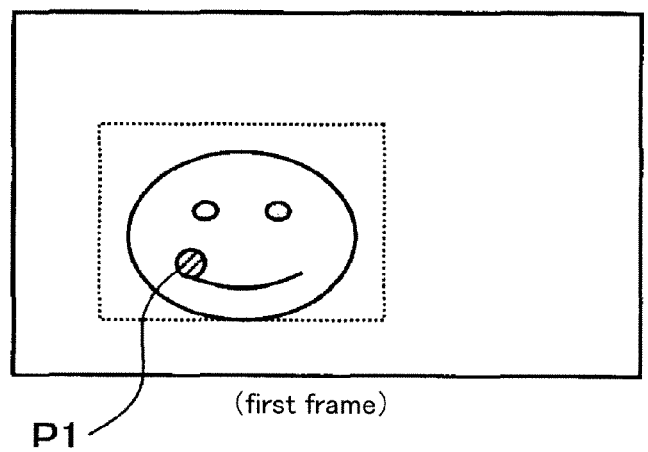
FIG. 2A is an illustration 1) of a representative point matching algorithm according to the exemplary embodiment.
Figure 2B:
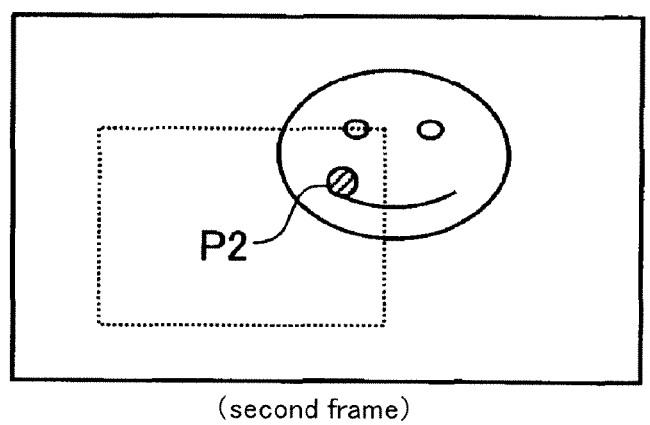
FIG. 2B is an illustration 2) of the representative point matching algorithm according to the exemplary embodiment.
Figure 2C:
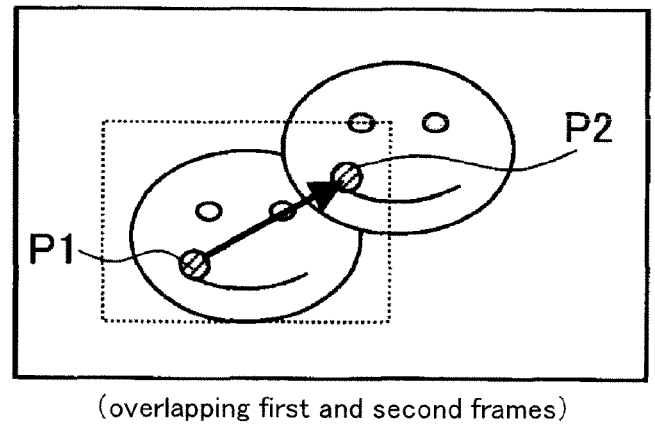
FIG. 2C is an illustration 3) of the representative point matching algorithm according to the exemplary embodiment.

The representative point matching process between frames carried out by the image processor 3 is described below. FIGS. 2A-2C are illustrations of an algorithm of the representative point inter-frame matching process. The representative point inter-frame matching process sets a block in an image date region (frame), and defines a representative point within the block (curb) to calculate how far the representative point transfers in a subsequent frame.

FIG. 2A illustrates an image of a first frame. In the first frame, the image processor 3 defines P1 as the representative point and retains information of the point P1. FIG. 2B illustrates an image of a second frame (frame immediately after the first frame). In the second frame, the image processor 3 searches how far in the second frame the point P1 defined as the representative point in the first frame transferred. FIG. 2C illustrates the images of the first and second frames overlapped on each other. As is clear from FIG. 2C, the representative point P1 defined in the first frame has transferred to a point P2 in the second frame. A distance by which the point P1 transferred is obtained as the degree of motion of the photographic subject, that is the on-screen motion information of the photographic subject. Thus, the photographic subject motion information is obtained as a result of the representative point inter-frame matching process.

Describing the angular rate information outputted from the lens unit 2, it is information of the degree of motion of the camera body 20 illustrated in FIG. 3, representing a detection result obtained by the angular rate sensor 1b on how far the camera body 20 moved. The angular rate information is used as the camera body motion information.

Figure 4:
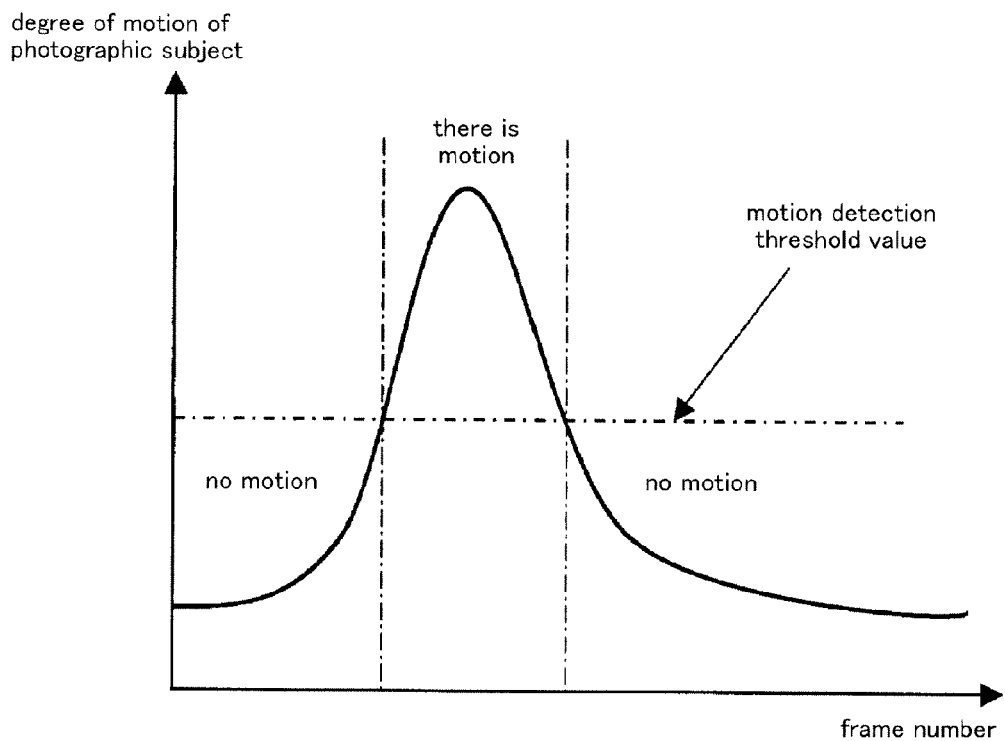
FIG. 4 is a chart illustrating a motion decision method according to the exemplary embodiment.

Next, a motion detection method used to decide each scene is described. FIG. 4 is a chart illustrating the motion decision method. To decide the motion, a motion decision threshold value is preset to detect whether the degree of motion exceeds the threshold value.

When there is a strenuous motion of the photographic subject in the video images and the motion is beyond a search range of motion, inter-frame prediction fails, increasing an encoding amount. In general, the motion of the photographic subject is desirably decided when the motion is beyond the search range of motion. Therefore, the threshold value used to decide the motion of the photographic subject is variable depending on the magnitude of the search range of motion. The encoding amount allocated to a frame changes as a frame rate or bit rate changes. Therefore, the threshold value used to decide the motion of the photographic subject is changed in accordance with the changing frame rate or bit rate.

Figure 5:
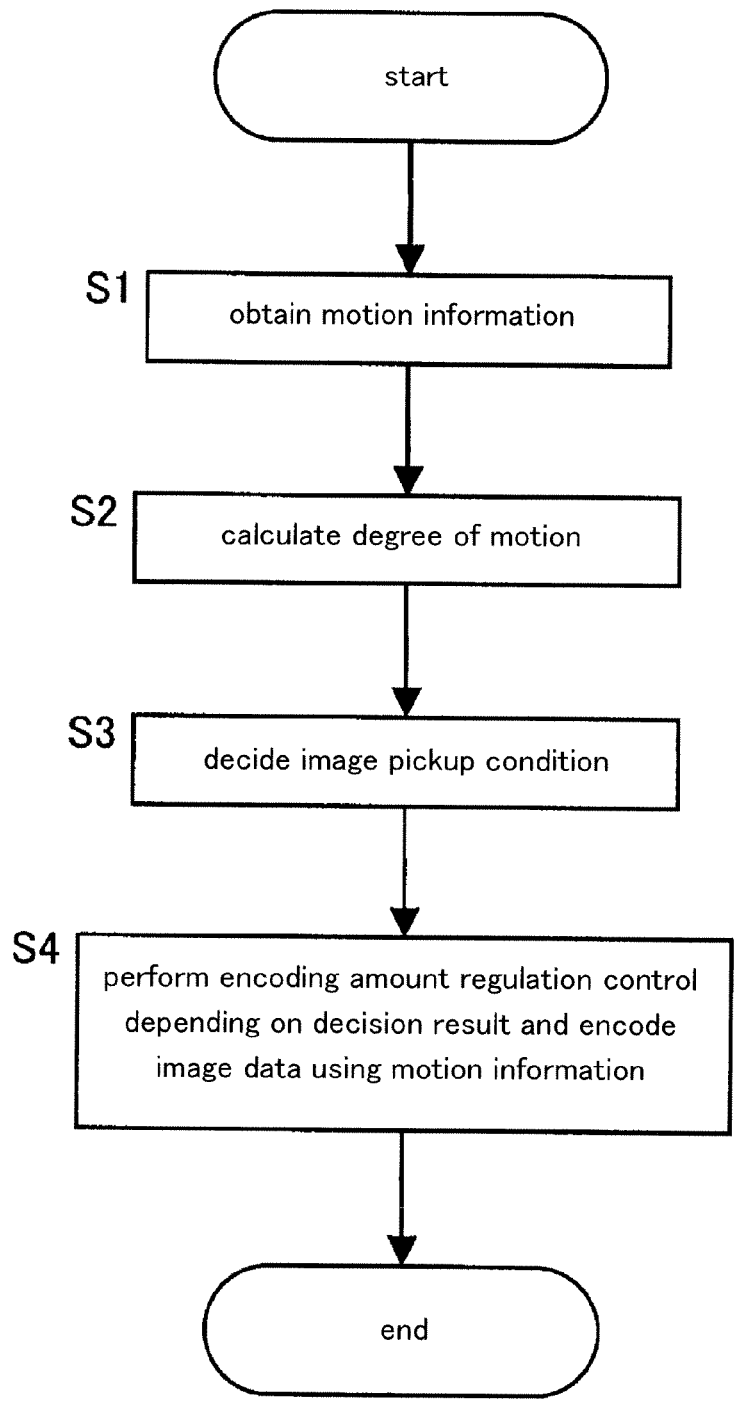
FIG. 5 is a flow chart 1) illustrating an operation of the video image pickup device according to the exemplary embodiment.

The processing steps carried out by the scene decision encoding controller 5 are described referring to a flow chart illustrated in FIG. 5. In Step S1, the scene decision encoding controller 5 obtains the photographic subject motion information and the camera body motion information prior to the encoding process. The obtained motion informations are elements used when the image processor 3 detects the motion of an encoding target. The obtained motion informations are the angular rate information obtained from the lens controller 2 (camera body motion information) and representative point matching data obtained from the image processor 3 (on-screen motion information of the photographic subject).

In Step S2, the scene decision encoding controller 5 calculates the degree of motion of the camera body from the angular rate information obtained from the lens controller 2 as the motion information. As illustrated in FIG. 3, the degree of motion in the angular rate information differs depending on how the lens is zoomed, telephoto zooming (telephoto state) or wide-angle zooming (wide-angle state). The degree of motion increases in the telephoto state although the angular rate information shows a small value. Therefore, the scene decision encoding controller 5 uses a value obtained by multiplying the angular rate information by a zooming ratio to calculate the degree of motion of the camera body 20 from the angular rate information. The zooming ratio is a ratio of a focal distance fy after the lens is zoomed to a focal distance fx when the zoom lens has a widest angle (fy/fx).

In Step S3, the scene decision encoding controller 5 decides which of the following situations is the current image pickup condition based on the photographic subject motion information obtained in Step S1 and the degree of motion of the camera body 20 calculated in Step S2:

"on-screen motion of photographic subject";
"motion of camera body alone";
"subject-following motion of camera body"; and
"neither photographic subject nor camera body in motion"

The decision of the image pickup condition will be described later referring to FIG. 6.

In Step s4, the scene decision encoding controller 5 performs an encoding amount regulation control suitable for the image pickup condition decided in Step S3 to the image compression/decompression processor 4. The encoding amount regulation control suitable for the decided image pickup condition is selected then.

Figure 6:
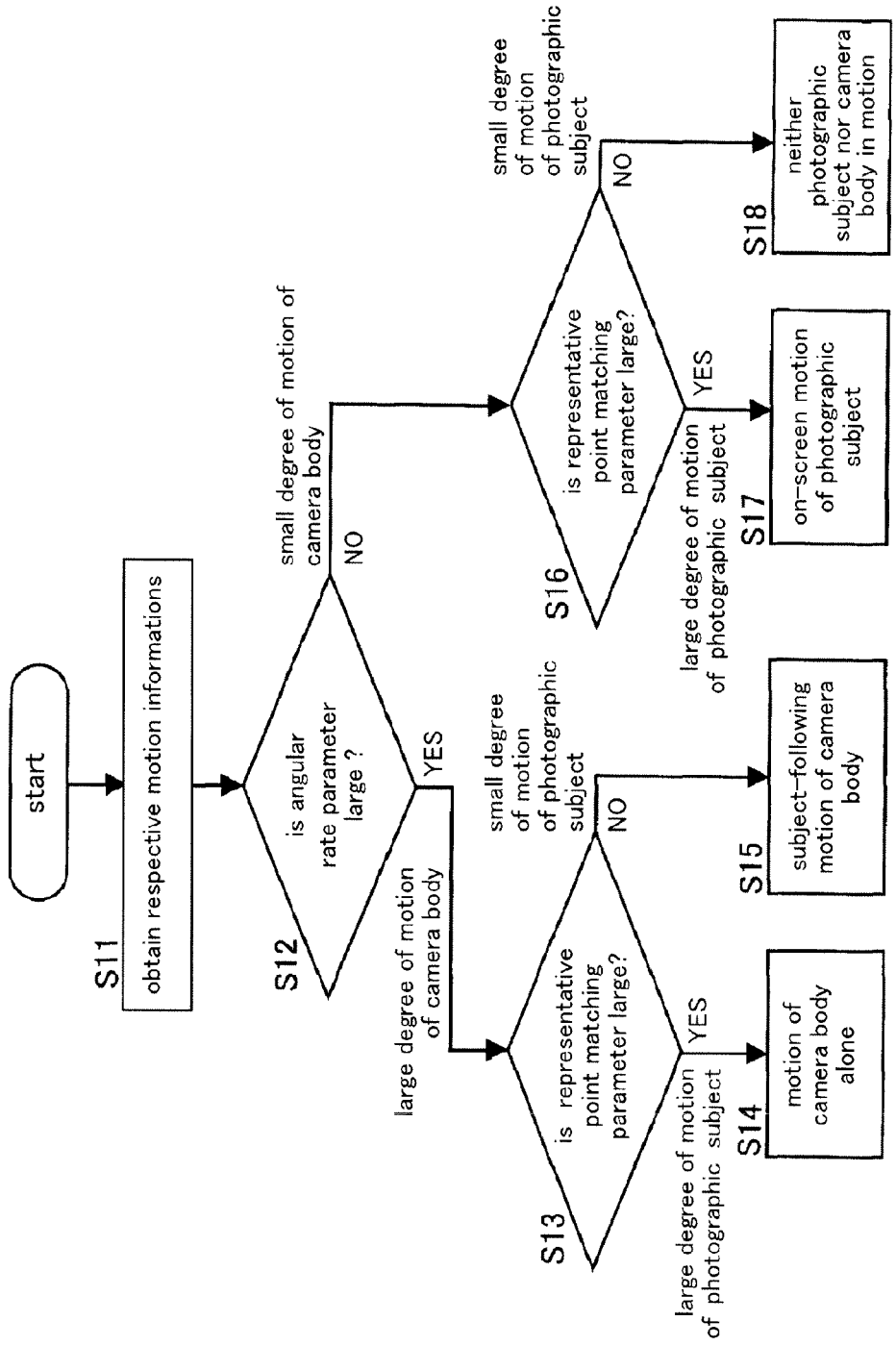
FIG. 6 is a flow chart 2) illustrating the operation of the video image pickup device according to the exemplary embodiment.

Referring to a flow chart illustrated in FIG. 6, a flow processing steps for deciding the image pickup condition carried out by the scene decision encoding controller 5 is described. The processing steps for deciding the image pickup condition are details of Step S3 illustrated in the flow chart of FIG. 5.

In Step S11, the scene decision encoding controller 5 obtains the respective motion informations and converts the obtained motion informations into motion decision parameters. In Step S12, the scene decision encoding controller 5 decides the motion of the camera body 20 based on the parameter of the angular rate sensor 1b (camera body motion information). When it is decided in Step S12 that there is a large degree of motion of the camera body 12 (the parameter exceeding the threshold value), the processing flow proceeds to Step S13. When it is decided in Step S12 that there is only a small degree of motion of the camera body 12, the processing flow proceeds to Step S16.

Step S13 and Step S16 decide the motion based on the representative point matching parameter. When it is decided in Step S13 that there is a large degree of on-screen motion of the photographic subject (the parameter exceeding the threshold value), the angular rate and the representative point matching both have large values. Then, the scene decision encoding controller 5 decides that a large degree of motion is detected in the camera and the photographic subject both, and decides in Step S14 that the image pickup condition is "motion of camera body alone". The situation of "motion of camera body alone" includes the following image pickup condition. In the case where there is a motion of the camera body 20 due to, for example, camera shake although there is no actual motion of the photographic subject, the angular rate information, which is the motion information of the camera body 20, shows a large value, therefore, the representative point matching information, which is the on-screen motion information of the photographic subject, show a large value as well. Based on the analysis thus given, the situation of "motion of camera body alone may be such an image pickup condition that a physical motion of a photographer during the image pickup, such as camera shake, is transmitted to the camera body 20 and detected in a next frame as the transfer of the representative point although there is no actual motion of the photographic subject.

When it is decided in Step S13 that there is only a small degree of on-screen motion of the photographic subject (the parameter below the threshold value), the angular rate alone shows a large value. Then, the scene decision encoding controller 5 decides that there is not a large on-screen motion of the photographic subject despite a large motion of the camera body 20, and decides in Step S15 that the image pickup condition is "subject-following motion of camera body". The situation of "subject-following motion of camera body" includes such an image pickup condition that a photographer moves the camera body alongside the motion of the photographic subject to capture the photographic subject in motion on the screen (panning/tilting). Under the image pickup condition, there is only a relatively small on-screen motion of the photographic subject despite a relatively large motion of the camera body 20. As far as the camera body 20 and the on-screen image of the photographic subject thus show the different motions, the representative point matching information, which is the on-screen motion of the photographic subject, has a small value although the angular rate, which is the motion information of the camera body 20, has a large value. Based on the analysis thus given, the situation of "subject-following motion of camera body" includes such an image pickup condition that a physical motion caused by the photographer during the image pickup as described earlier may be transmitted to the camera body but is hardly detected in the on-screen image of photographic subject (hardly detected as the transfer of the representative point in a next frame).

When it is decided in Step S16 that there is a motion (the parameter exceeding the threshold value), the representative point matching information alone has a large value. Then, the scene decision encoding controller 5 decides that there is not a large motion of the camera body 20 despite a large on-screen motion of the photographic subject, and decides in Step S17 that the image pickup condition is "on-screen motion of photographic subject". The situation of "on-screen motion of photographic subject" includes such an image pickup condition that angular rate, which is the motion information of the camera body 20, shows a small value and the representative point matching information, which is the on-screen motion information of the photographic subject, shows a large value as far as there is an actual motion of the photographic subject although no motion is detected in the camera body 20 due to, for example, camera shake. Based on the analysis thus given, the situation of "on-screen motion of photographic subject" includes such an image pickup condition that the on-screen motion of the photographic subject is detected as the transfer of the representative point in a next frame because of an actual motion of the photographic subject in the absence of any physical motion, such as camera shake, generated by a photographer during the image pickup, panning, or tilting.

When it is decided in Step S16 that there is a small degree motion (the parameter below the threshold value), the angular rate information and the representative point matching information both have small values. Then, the scene decision encoding controller 5 decides that neither of the camera body 20 nor the photographic subject image on the screen is in motion, and decides in Step S18 that the image pickup condition is "neither photographic subject nor camera body in motion". Describing the situation of "neither photographic subject nor camera body in motion", the angular rate, which is the motion information of the camera body 20, has a small value, and the representative point matching information, which is the on-screen motion of the photographic subject, also has a small value. Based on the analysis thus given, the situation of "neither photographic subject nor camera body in motion" includes such an image pickup condition that the transfer of the representative point is not detected in a next frame because the photographic subject is not in motion and there is no physical motion, such as camera shake, generated by a photographer during the image pickup, panning, or tilting.

1) In the image pickup condition decided as "motion of camera body alone", the entire image is in motion, which makes deterioration of an image quality less noticeable. Taking advantage of such visual characteristics, the scene decision encoding controller 5, when the image pickup condition is decided as "motion of camera body alone", controls the image compression/decompression processor 4 so that high frequency components of the inputted YC data are removed to reduce the encoding amount. Because sudden reduction of the frequency components is easily visually recognized, the frequency components should be reduced in stages by each frame.

When the degree of motion of the camera body 20 significantly increases under the image pickup condition decided as "motion of camera body alone", reduction of the frequency components in the YC data is not effective enough to regulate the encoding amount. Therefore, the scene decision encoding controller 5 provides a threshold value for deciding whether there is a significantly large motion of the camera body 20, and decides that an image of the relevant frame should be disregarded when the angular rate information exceeds the threshold value. Then, the scene decision encoding controller 5 controls the image compression/decompression processor 4 not to remove the high frequency components of the YC data but to simply skip the frame per se so that the frame is never encoded.

However, the frame skipping is not possible in any image data adapted to such a standard for video image stream as AVCHD (Advanced Video Codec High Definition), in which the frame skipping is judged to be violating the standard. In that case, the scene decision encoding controller 5 inserts a dummy frame in which all of macro blocks are skip macro blocks in the relevant frame in place of the frame skipping, or the scene decision encoding controller 5 controls the image compression/decompression processor 4 so that a previous frame image is used again as a current frame image.

2) Under the image pickup condition decided as "subject-following motion of camera body", the scene decision encoding controller 5 controls the image compression/decompression processor 4 to omit the encoding amount regulation control because a photographer during the image pickup while capturing the photographic subject in motion in a predetermined region of the screen probably wants images with a higher definition. Because any image data including many high frequency components unfavorably increases the encoding amount, the scene decision encoding controller 5 controls the image compression/decompression processor 4 based on the frequency distribution information obtained by the image processor 3 to regulate the encoding amount by increasing the quantization step in the region of high frequency components to compress the image data with a higher compression rate.

3) Under the image pickup condition decided as "on-screen motion of photographic subject", the scene decision encoding controller 5 controls the image compression/decompression processor 4 to regulate the encoding amount by increasing the quantization step to compress the image data with a higher compression rate.

Under the image pickup condition decided as "neither photographic subject nor camera body in motion", the scene decision encoding controller 5 does not perform the encoding amount regulation control to the image compression/decompression processor 4.

The encoding amount regulation control based on the decision of the image pickup condition described so far is useful in digital still cameras and digital video cameras. Such an encoding amount regulation control possibly adversely affects any image pickup devices where a camera is fixed to capture images of any moving subject and it is desirable display the images without deteriorating an image quality such as monitoring cameras and network cameras. Therefore, the encoding amount regulation control after the image pickup condition is decided should be changeable depending on an intended use of the device.

INDUSTRIAL APPLICABILITY

The video image pickup device according to the present invention decides the image pickup condition based on two different informations; motion information of the camera body and motion information of the photographic subject, and outputs the decision result thereby obtained as the encoding control information. Therefore, the encoding amount can be favorably regulated in any frames including a large degree of motion, and the encoding amount can be allocated to any frames where the motion is over. As a result, an image quality can be greatly improved. The present invention thus technically advantageous is very useful in digital still cameras and digital video cameras.

DESCRIPTION OF REFERENCE SYMBOLS 1 sensor unit
1a image sensor
1b angular rate sensor
2 lens controller
3 image processor
4 image compression/decompression processor
5 scene decision encoding controller
6 image display processor
7 CPU
8 external memory
9 display unit
10 recording medium
11 lens unit
12 video image pickup device
20 camera body

What is claimed is:
1. A video image pickup device, comprising:
an image processor configured to detect an on-screen motion of a photographic subject in video image data generated by an image sensor provided in a camera body and output a photographic subject motion information;
an image compression processor configured to compress the video image data into codes;
a sensor configured to detect a motion of the camera body and output the detected motion as a camera body motion information; and
a scene decision encoding controller configured to decide an image pickup condition of the video image data based on the photographic subject motion information and the camera body motion information, wherein
the scene decision encoding controller performs an encoding amount regulation control suitable for the decided image pickup condition to the image compression processor.

2. The video image pickup device as claimed in claim 1, wherein
the image pickup condition is a condition where an actual motion of the photographic subject and the motion of the camera body are combined.

3. The video image pickup device as claimed in claim 1, wherein
the scene decision encoding controller decides the image pickup condition based on combination of a degree of the motion of the camera body indicated by the camera body motion information and a degree of the on-screen motion of the photographic subject in the video image data indicated by the photographic subject motion information.

4. The video image pickup device as claimed in claim 1, wherein
the sensor detects an angular rate applied to the camera body as the motion of the camera body.

5. The video image pickup device as claimed in claim 4, further comprising:
a lens controller configured to give a motion to balance out the angular rate to a lens unit which condenses an imaging light on the image sensor to thereby compensate for an on-screen motion of the photographic subject generated by the angular rate which should be disregarded; and
an angular rate sensor configured to detect the angular rate and output the detected angular rate to the lens controller, wherein
the angular rate sensor serves as the sensor.

6. The video image pickup device as claimed in claim 1, wherein
the image processor detects a representative point motion information obtained from inter-frame matching of a representative point defined on a screen as the photographic subject motion information.

7. The video image pickup device as claimed in claim 1, wherein
the image processor further detects a frequency distribution information in the video image data, and
the scene decision encoding controller controls the image compression processor so that the encoding amount regulation control is performed suitably for the decided image pickup condition in each of frequency bands divided based on the frequency distribution information in the video image data.

8. The video image pickup device as claimed in claim 1, wherein
the sensor detects an angular rate applied to the camera body as the motion of the camera body,
the image processor detects a representative point motion information obtained from inter-frame matching of a representative point defined on a screen as the photographic subject motion information,
the image processor further detects a frequency distribution information in the video image data, and the scene decision encoding controller selects one of the angular rate, the representative point motion information, and the frequency distribution information depending on an intended purpose of the video image pickup device and uses the selected information to decide the image pickup condition.

9. The video image pickup device as claimed in claim 8, wherein
the scene decision encoding controller differently combines the angular rate, the representative point motion information, and the frequency distribution information depending on an intended purpose of the video image pickup device and uses the combined information to decide the image pickup condition.

10. The video image pickup device as claimed in claim 1, wherein
the scene decision encoding controller performs the encoding amount regulation control by filtering/removing high frequency components.

11. The video image pickup device as claimed in claim 10, wherein
the scene decision encoding controller performs a filtering setting in multiple stages per a plurality of frames in the filtering/removal of the high frequency components.

12. The video image pickup device as claimed in claim 1, wherein
the scene decision encoding controller performs the encoding amount regulation control by skipping a frame.

13. The video image pickup device as claimed in claim 1, wherein
the scene decision encoding controller performs the encoding amount regulation control by inserting a dummy frame.

14. The video image pickup device as claimed in claim 1, wherein
the scene decision encoding controller performs the encoding amount regulation control by multiplexing a frame.

15. The video image pickup device as claimed in claim 1, wherein
the scene decision encoding controller performs the encoding amount regulation control by increasing a quantization step.

16. The video image pickup device as claimed in claim 1, wherein
the scene decision encoding controller performs the encoding amount regulation control by performing one of the followings; filtering/removal of high frequency components, insertion of a dummy frame, multiplexing of a frame, and increasing of a quantization step.

17. The video image pickup device as claimed in claim 1, wherein
the scene decision encoding controller uses threshold values in multiple stages to decide the motion of the photographic subject.

18. The video image pickup device as claimed in claim 1, wherein
the scene decision encoding controller uses threshold values and selects one of the threshold values to be used depending on an encoding search range magnitude.

19. The video image pickup device as claimed in claim 1, wherein
the scene decision encoding controller uses threshold values and selects one of the threshold values to be used depending on an encoding frame rate or a bit rate.

20. The video image pickup device as claimed in claim 1, wherein
the image compression processor is an image compression/decompression processor capable of decompressing the video image data.

21. The video image pickup device as claimed in claim 1, further comprising an image display processor in charge of image display control of the video image data.

22. A device deciding an image pickup condition, comprising:
a scene decision controller configured to decide the image pickup condition of a video image data based on a photographic subject motion information and a camera body motion information, wherein
the photographic subject motion information is generated by detecting an on-screen motion of a photographic subject in the video image data,
the camera body motion information is generated by detecting a motion of a camera body, and
the scene decision controller performs an encoding amount regulation control.

23. The device deciding an image pickup condition as claimed in claim 22, wherein the camera body motion information is generated by detecting an angular rate applied to the camera body as the motion of the camera body.

24. The device deciding an image pickup condition as claimed in claim 22, wherein
the scene decision controller performs the encoding amount regulation control by skipping a frame.

25. The device deciding an image pickup condition as claimed in claim 22, wherein
the scene decision controller performs the encoding amount regulation control by inserting a dummy frame.

26. The device deciding an image pickup condition as claimed in claim 23, further comprising: a lens controller configured to detect the angular late and give a motion to balance out the angular rate to a lens unit which condenses an imaging light on an image sensor to thereby compensate for a on-screen motion of the photographic subject generated by the angular rate which should be disregarded.

27. The device deciding an image pickup condition as claimed in claim 22, further comprising:
an image processor configured to detect the on-screen motion of the photographic subject in the video image data and output the photographic subject motion information;
an image compression processor configured to compress the video image data into codes, wherein
the image processor further detects a frequency distribution information in the video image data, and
the scene decision controller controls the image compression processor so that the encoding amount regulation control is performed suitably for the decided image pickup condition in each of frequency bands divided based on the frequency distribution information in the video image data.

28. The device deciding an image pickup condition as claimed in claim 22, further comprising:
an image processor configured to detect the on-screen motion of the photographic subject in the video image data and output the photographic subject motion information, wherein the camera body motion information is generated by detecting an angular rate applied to the camera body as the motion of the camera body,
the image processor detects a representative point motion information obtained from inter-frame matching of a representative point defined on a screen as the photographic subject motion information, the image processor further detects a frequency distribution information in the video image data, and the scene decision controller selects one of the angular rate, the representative point motion information, and the frequency distribution information depending on an intended purpose of a video image pickup device and uses the selected information to decide the image pickup condition.

29. The video image pickup device as claimed in claim 28, wherein the scene decision controller differently combines the angular rate, the representative point motion information, and the frequency distribution information depending on an intended purpose of a video image pickup device and uses the combined information to decide the image pickup condition.

30. The video image pickup device as claimed in claim 22, wherein the scene decision controller uses threshold values and selects one of the threshold values to be used depending on an encoding search range magnitude.

31. The video image pickup device as claimed in claim 22, wherein the video image data is generated by an image sensor provided in the camera body, and the motion of the camera body is detected by a sensor provided in the camera body.

32. An image pickup condition deciding method, comprising:
receiving a photographic subject motion information generated by detecting an on-screen motion of a photographic subject in a video image data;
receiving a camera body motion information generated by detecting a motion of a camera body;
deciding an image pickup condition of the video image data based on the photographic subject motion information and the camera body motion information, and
performing an encoding amount regulation control.

33. The image pickup condition deciding method as claimed in claim 32, wherein the camera body motion information is generated by detecting an angular rate applied to the camera body as the motion of the camera body.

34. The image pickup condition deciding method as claimed in claim 32,
wherein the encoding amount regulation control is performed by skipping a frame.

35. The image pickup condition deciding method as claimed in claim 32,
wherein the encoding amount regulation control is performed by inserting a dummy frame.

* * * * *